United States Patent Office 2,959,606
Patented Nov. 8, 1960

2,959,606

PRODUCTION OF ALUMINUM ACETYL-SALICYLATE

Arun K. Mitra, St. Louis, and Courtney G. Pitkin, University City, Mo., assignors to Lewis-Howe Company, St. Louis, Mo., a corporation of Delaware No Drawing. Filed Sept. 18, 1956, Ser. No. 610,653

7 Claims. (Cl. 260—448)

The present invention relates generally to the production of a metal salt of acetylsalicylic acid, and more particularly to a novel method for producing aluminum acetylsalicylate and particularly mono-hydroxy aluminum di-acetylsalicylate in substantially pure form.

It has long been known that pure salicylic acid is very effective in alleviating pain and reducing fever but that large and frequent doses thereof almost always result in nausea, often in spasms of vomiting, and sometimes even in coma.

These undesirable effects were obviated to a considerable extent by using the substance in the form of acetylsalicylic acid which is more commonly known as aspirin. Although aspirin has been used primarily for its analgesic and antipyritic effects, recent investigations into the nature of the pharmacological action of this drug and its relationship with the adrenal cortical hormones may have profound effects on the future therapy of other ailments.

With some persons, however, even a normal dosage of aspirin causes severe gastric disturbances, and in some cases where it is necessary to administer large doses, as with certain types of rheumatism or other diseases, severe gastric disturbances and salicylism often result.

Another outstanding disadvantage is that aspirin is very easily broken down into acetic acid and salicylic acid upon being exposed to the moisture in the air, and, as pointed out hereinabove, salicylic acid is very disturbing to the stomach.

Some suppliers have endeavored to overcome the disadvantages of aspirin by adding to it certain antacids such as aluminum glycinate and magnesium carbonate. However, because antacids would normally increase the breakdown of aspirin into acetic acid and salicylic acid, it is necessary to coat the antacids with a gelatin mixture, thereby greatly increasing the cost of the product.

Other suppliers have turned to the sodium and calcium salts of salicylic acid but these are even more unstable than aspirin itself, and quickly break down into salicylic acid.

On the other hand, we have learned that the mono-hydroxy aluminum salt of acetylsalicylic acid is outstandingly suitable for therapeutic use because it is stable, tasteless and non-acidic. It is also insoluble in water, alcohol, ether, toluene and other conventional organic solvents but is decomposed in an alkaline or acid medium. It is decidedly more stable than aspirin, probably because of the amphoteric nature of the aluminum ion. Thus, the mono-hydroxy aluminum salt of aspirin is broken down in a patient's stomach by the hydrochloric acid, into salicylic acid and aluminum hydroxide, the latter functioning as a "built in" antacid.

We are aware of the fact that others have endeavored to produce pure aluminum acetylsalicylate, but they have met with only limited success. In the known process for producing this product, aluminum chloride is reacted with sodium aspirin in the presence of an excess of sodium carbonate. Because of the violent reaction between the aluminum chloride and the sodium carbonate, excessive frothing occurs and it is therefore very difficult to control the reaction when large quantities of the reactants are employed. Also, because of the foaming, the aspirin comes out on the surface and the reaction does not go to completion. In addition, it is difficult to prepare a chemically pure substance by this method, and the yield is relatively small.

We have discovered that substantially pure mono-hydroxy aluminum di-acetylsalicylate can be easily and quickly produced by reacting aspirin with an aluminum alcoholate in the presence of water. Outstanding results have been obtained with aluminum isopropylate but alcoholates such as propyl alcoholates, butyl alcoholates, amyl alcoholates, and hexyl alcoholates can also be used with satisfactory results. In addition to aluminum isopropylate, the specific alcoholates which are deemed to be especially suitable are aluminum normal propylate, aluminum normal primary butylate, aluminum normal secondary butylate, and aluminum tertiary butylate. It will readily be understood that cost and other economic factors will determine to a large extent which alcoholate is used.

At the present time, there is no known available solvent for aluminum methyl alcoholate or aluminum ethyl alcoholate, and therefore, we have been unable to test these compounds. However, it is suspected that these two alcoholates would also react with aspirin to produce the aluminum salt of aspirin but we are unable to predict at this time whether the process would be as satisfactory as the other, or whether the resultant product would be substanially pure mono-hydroxy aluminum di-acetylsalicylate, as is the case when aluminum alcoholates of an order higher than ethoxide are used.

According to the teachings of the present invention, any one of a number of similar methods can be employed to produce substantially pure mono-hydroxy aluminum di-acetylsalicylate. Thus, for example, aspirin and aluminum isopropylate, each individually dissolved in a suitable solvent such as toluene, alcohol or other neutral organic solvent, are mixed together and the aluminum salt of aspirin precipitated by the gradual addition of or taking up of water. Also, the aluminum isopropylate in a liquid form can be added to an aspirin solution and the salt precipitated by the addition of or taking up of water. Then again, aspirin in powdered or crystalline form, or aspirin suspended in a liquid, can be mixed with liquid aluminum isopropylate or aluminum isopropylate dissolved in a suitable solvent, and the aluminum salt of aspirin precipitated as previously described. Although normal aluminum salt of aspirin may be formed when the aluminum alcoholate and aspirin are reacted together in solution, mono-hydroxy aluminum di-acetylsalicylate will not be formed until water is present. The water may be added to the aspirin in solution prior to the addition of the aluminum alcoholate or it may be added to the aluminum alcoholate and aspirin in solution.

Set out below are illustrated examples of methods for producing mono-hydroxy aluminum di-acetylsalicylate in accordance with the teachings of the present invention. It is to be understood, however, that these are given only by way of illustration and not by way of limitation.

*Example No. 1*

360 grams of aspirin are dissolved or suspended in ethyl alcohol and 204 grams of aluminum isopropylate are dissolved in toluene. The two liquids are thoroughly mixed together and the mono-hydroxy aluminum salt of aspirin is precipitated by the gradual addition or taking up of water. When precipitation is complete, the precipitate is filtered, washed with alcohol or any other suitable solvent of aspirin and then dried.

Example No. 2

204 grams of liquid aluminum isopropylate are added to 360 grams of aspirin dissolved or suspended in isopropyl alcohol, and the mixture is vigorously stirred. The mono-hydroxy aluminum salt of aspirin is then precipitated by the gradual addition or taking up of water and the precipitate is then filtered, washed with alcohol, and dried.

Example No. 3

360 grams of aspirin are dissolved or suspended in isopropyl alcohol and 204 grams of aluminum isopropylate are dissolved in isopropyl alcohol. The two liquids are thoroughly mixed together and the mono-hydroxy aluminum salt of aspirin is precipitated by the gradual addition or taking up of water. When precipitation is complete, the precipitate is filtered, washed with alcohol, and dried.

Example No. 4

36 grams of powdered or crystalline aspirin in dry form are added to 20.4 grams of aluminum isopropylate dissolved in toluene and the mixture stirred vigorously. A small amount of water is added to cause the mono-hydroxy aluminum salt of aspirin to precipitate and the precipitate is then filtered, washed with alcohol, and dried.

Example No. 5

36 grams of powdered or crystalline aspirin in dry form are added to 20.4 grams of aluminum isopropylate dissolved in isopropyl alcohol and the mixture stirred vigorously. A small amount of water is added to cause the mono-hydroxy aluminum salt of aspirin to precipitate and the precipitate is then filtered, washed with alcohol, and dried.

The mono-hydroxy aluminum salt of aspirin produced according to the teachings of the present invention is insoluble in water, alcohol, ether, toluene and many other neutral organic solvents.

It is decomposed in an alkaline or acid medium and is tasteless and stable.

All chemical analysis as well as such qualitative means of detection as the infrared analysis indicate that the aluminum acetylsalicylate so formed is substantially pure mono-hydroxy aluminum di-acetylsalicylate which has the formula $(CH_3COOC_6H_4COO)_2AlOH$.

It is to be understood that the foregoing description and examples have been given only by way of illustration, and that the processes are susceptible of variation without departing from the scope of the invention, which is limited only by the claims which follow.

What is claimed is:

1. The method of producing substantially pure mono-hydroxy aluminum salt of aspirin which consists essentially of the steps of dissolving about 2 mols of aspirin in alcohol; dissolving about 1 mol of aluminum isopropylate in toluene; thoroughly mixing together the two solutions; gradually adding water to the mixed solutions until the mono-hydroxy aluminum salt of aspirin is precipitated; and then filtering the precipitate, washing it with alcohol, and drying it.

2. The method of producing substantially pure mono-hydroxy aluminum salt of aspirin which consists essentially of the steps of mixing together about 1 mol of liquid aluminum isopropylate and about 2 mols of aspirin dissolved in isopropyl alcohol; gradually adding water to the mixture until the mono-hydroxy aluminum salt of aspirin is precipitated; and then filtering the precipitate, washing it with alcohol, and drying it.

3. The method of producing substantially pure mono-hydroxy aluminum salt of aspirin which consists essentially of the steps of dissolving about 2 mols of aspirin in isopropyl alcohol; dissolving about 1 mol of aluminum isopropylate in isopropyl alcohol; throughly mixing together the two solutions; gradually adding water to the mixed solutions until the mono-hydroxy aluminum salt of aspirin is precipitated; and then filtering the precipitate, washing it with alcohol, and drying it.

4. The method of producing substantially pure mono-hydroxy aluminum salt of aspirin which consists essentially of reacting together about two mols of aspirin and about one mol of an aluminum alcoholate in the presence of water, said aluminum alcoholate being in liquid form prior to the reaction of said aspirin therewith.

5. The method of producing substantially pure mono-hydroxy aluminum salt of aspirin which consists essentially of reacting together about two mols of aspirin and about one mol of an aluminum alcoholate in the presence of water, one of said aspirin and aluminum alcoholate being dissolved in a neutral organic solvent prior to the reaction of the other of said aspirin and aluminum alcoholate therewith.

6. The method of producing substantially pure mono-hydroxy aluminum salt of aspirin which consists essentially of dissolving about two mols of aspirin in a neutral organic solvent and reacting therewith in the presence of water about one mol of an aluminum alcoholate selected from the class consisting of the orders of aluminum alcoholates between aluminum ethyl alcoholate and aluminum hexyl alcoholate.

7. The method of producing substantially pure mono-hydroxy aluminum salt of aspirin which consists essentially of reacting together about two mols of aspirin and about one mol of aluminium isopropylate in the presence of water, one of said aspirin and aluminum isopropylate being dissolved in a neutral organic solvent prior to the reaction of the other of said aspirin and aluminum isopropylate therewith.

References Cited in the file of this patent

UNITED STATES PATENTS

| | | |
|---|---|---|
| 1,447,501 | Altwegg | Mar. 6, 1923 |
| 1,967,649 | Wolf | July 24, 1934 |

FOREIGN PATENTS

| | | |
|---|---|---|
| 569,946 | Germany | Feb. 9, 1933 |
| 519,092 | Belgium | Apr. 30, 1953 |

OTHER REFERENCES

Krantz, The Journal of Pharmacology and Experimental Therapeutics, vol. 82 (November 1944), pp. 247–253.